July 31, 1951  E. J. BUSEMEYER  2,562,170
MACHINE TOOL
Filed Sept. 30, 1946  7 Sheets-Sheet 4
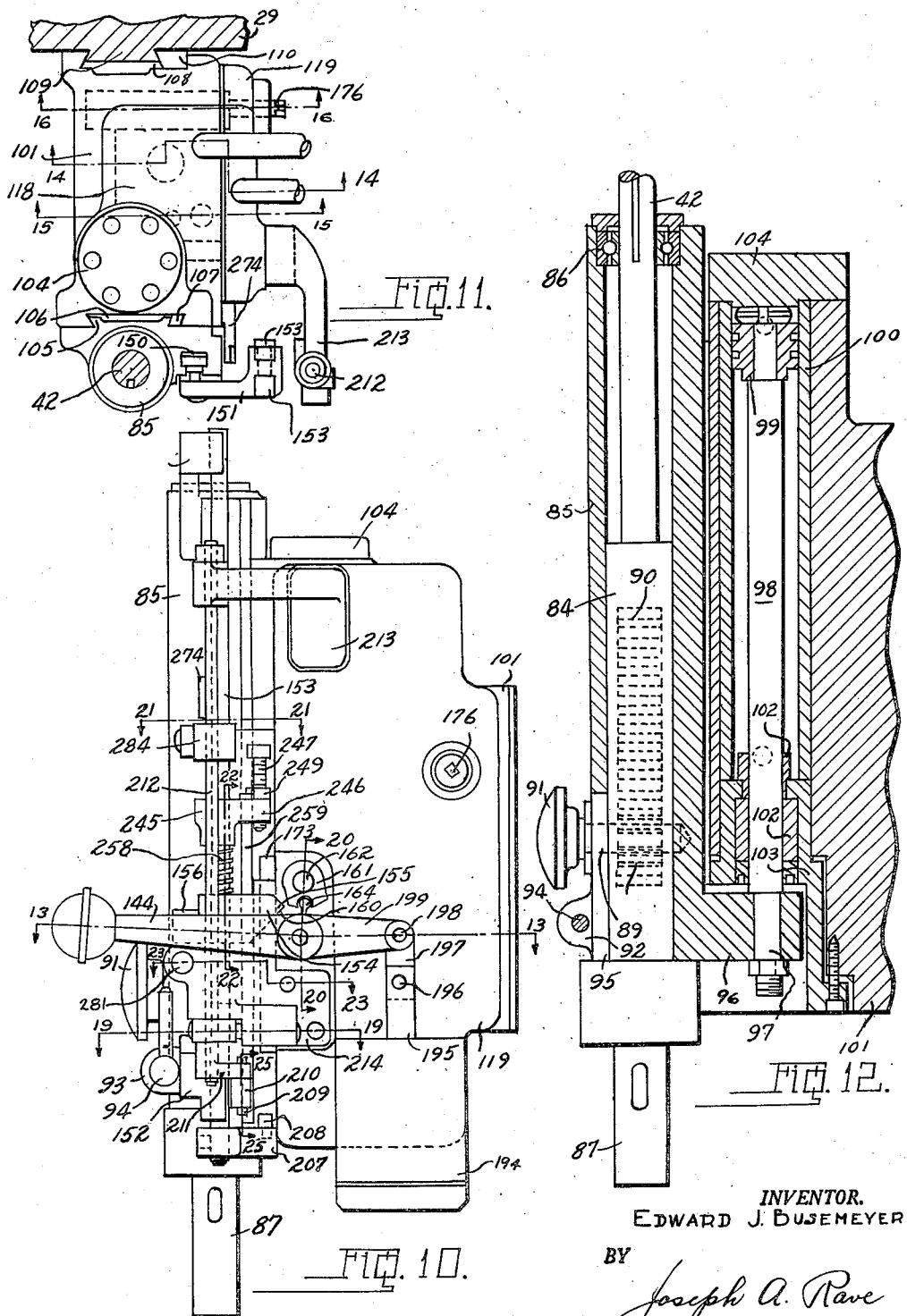
INVENTOR.
EDWARD J. BUSEMEYER
BY
Joseph A. Rave
Attorney.

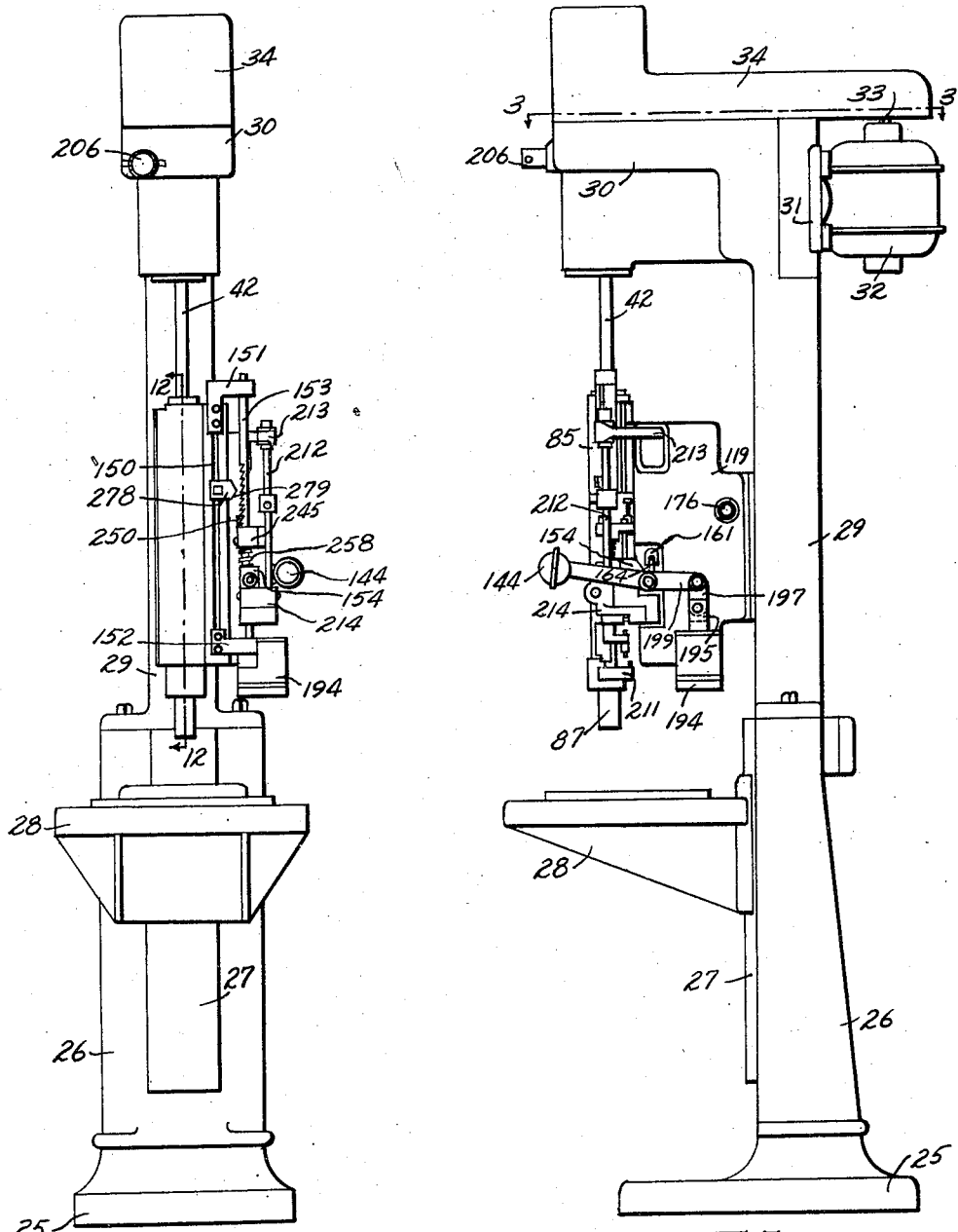

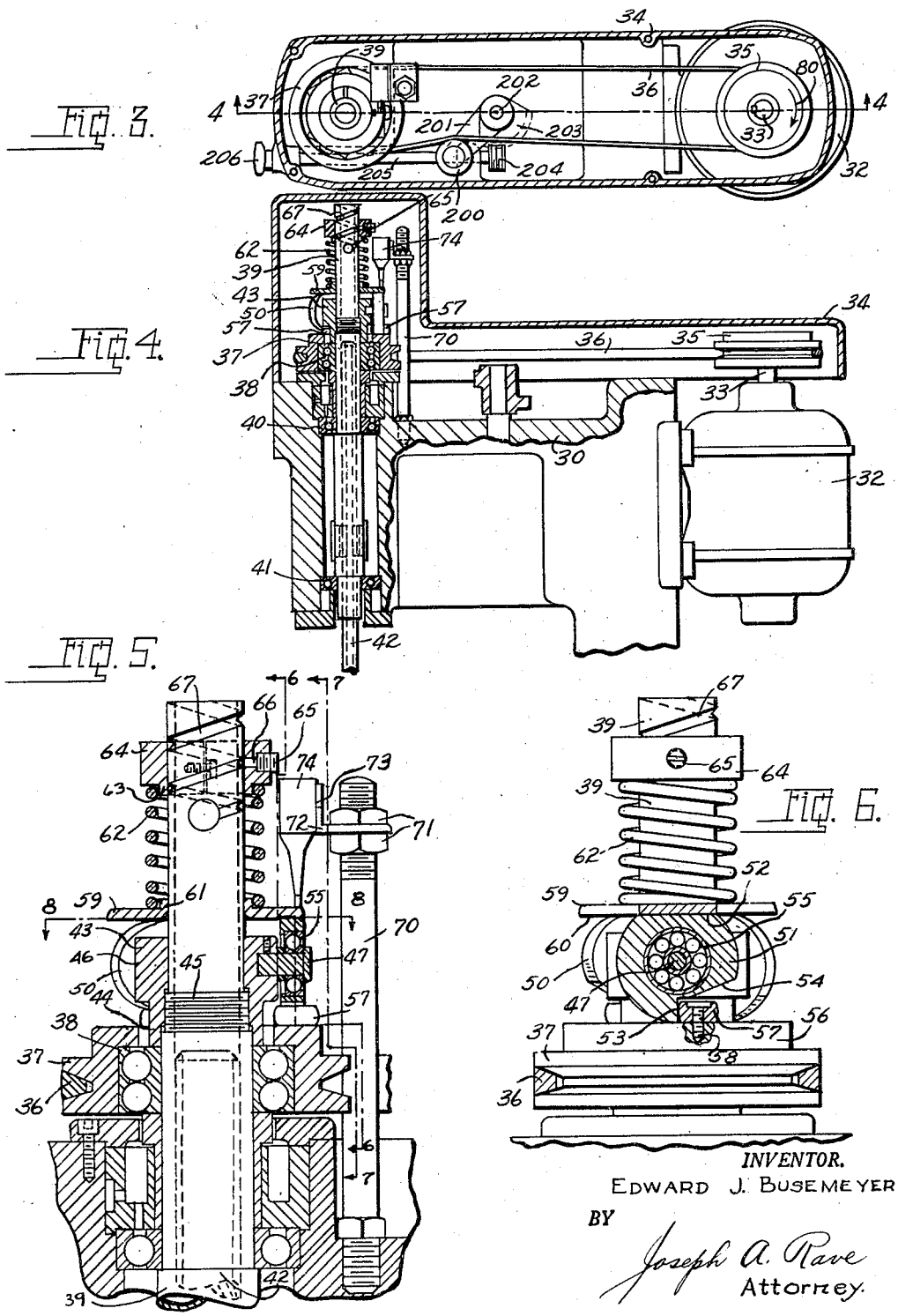

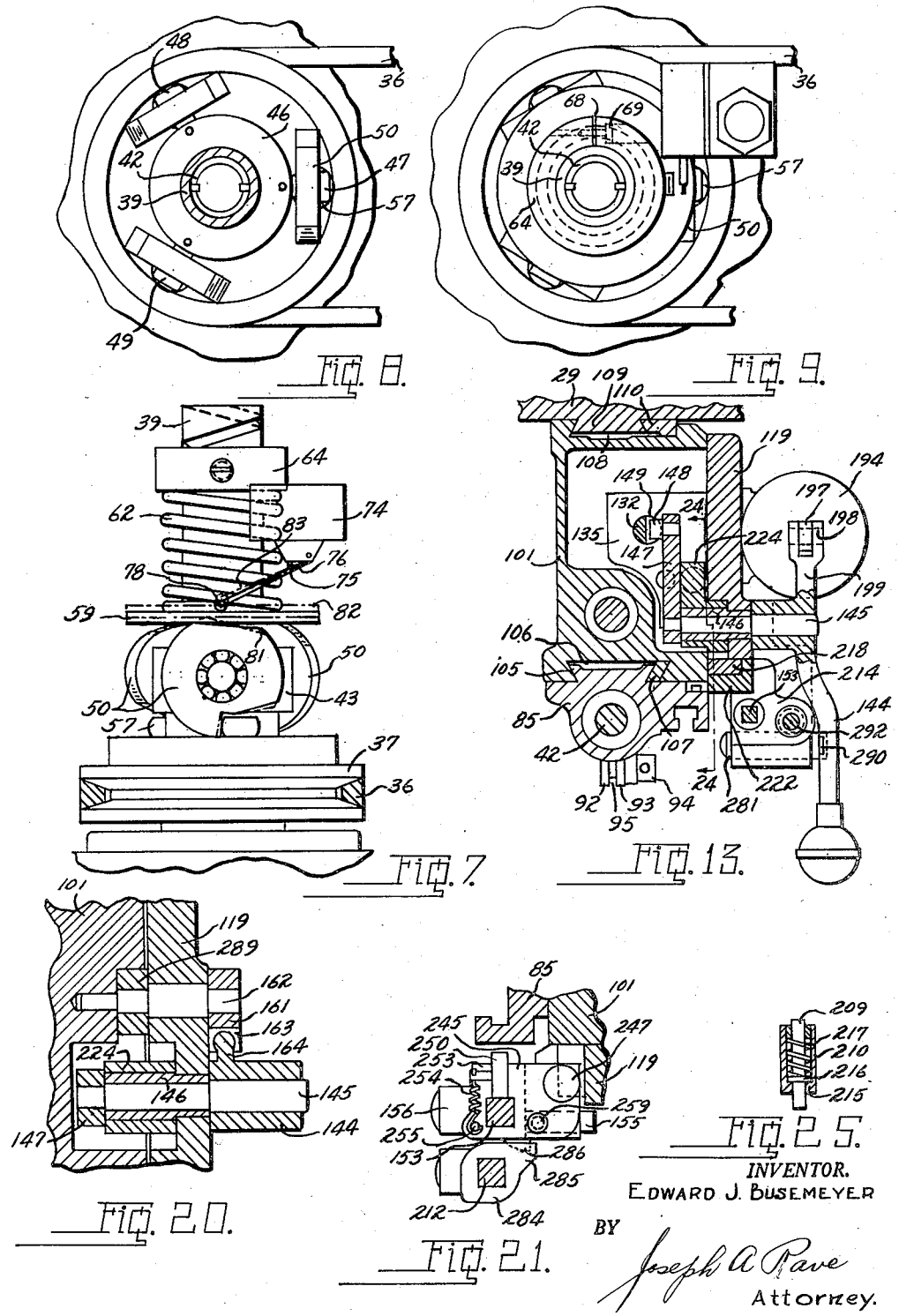

July 31, 1951 E. J. BUSEMEYER 2,562,170
MACHINE TOOL
Filed Sept. 30, 1946 7 Sheets-Sheet 5

INVENTOR.
EDWARD J. BUSEMEYER
BY
Joseph A. Rave
Attorney.

July 31, 1951  E. J. BUSEMEYER  2,562,170
MACHINE TOOL

Filed Sept. 30, 1946  7 Sheets-Sheet 6

INVENTOR.
EDWARD J. BUSEMEYER
BY Joseph A. Rave
Attorney.

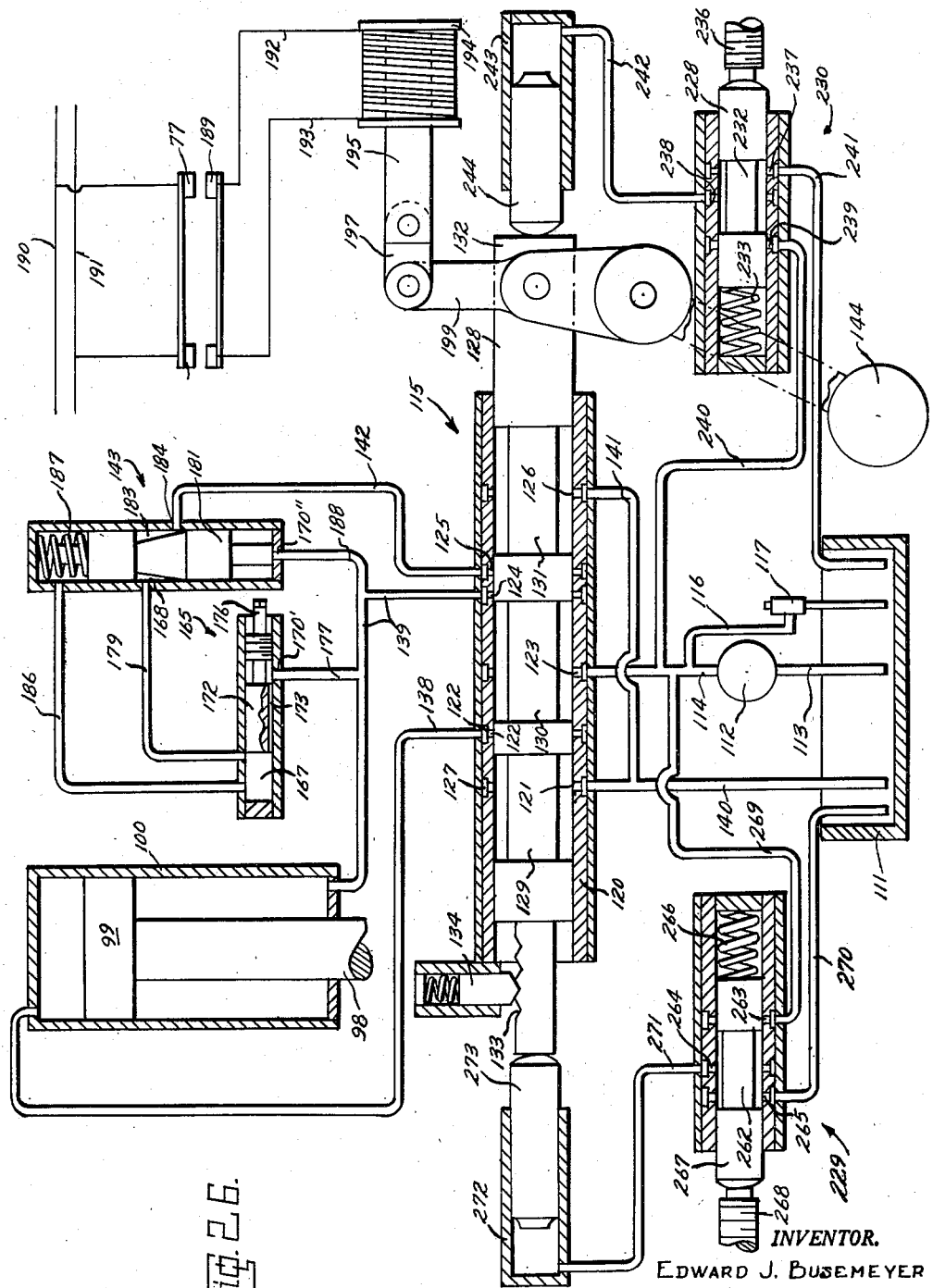

Patented July 31, 1951

2,562,170

UNITED STATES PATENT OFFICE 2,562,170

MACHINE TOOL

Edward J. Busemeyer, Cincinnati, Ohio, assignor to The Avey Drilling Machine Company, Covington, Ky., a corporation of Ohio Application September 30, 1946, Serial No. 700,223

11 Claims. (Cl. 77—29)

This invention relates to improvements in machine tools and particularly to improvements in high speed or sensitive drilling machines.

In the past there have been provided high speed drilling machines for performing deep hole or step drilling operations. As is well known step drilling contemplates a drilling machine wherein the drill or tool is actuated through short drilling steps without causing the drill or tool to completely penetrate the work. It has been found that to set up definite intervals of step drilling consumed more time than was desirable since to be safe the actual drilling time was reduced to a minimum while in the majority of cases this drilling step could have continued for a considerably longer time without endangering the drill, tool or work.

It has further been proposed to augment the control of the tool feed by utilizing the torque on the drill as a means for effecting the withdrawal of the drill from the work. Such a mechanism is disclosed in United States Patent 2,260,327 which issued on October 28, 1941, to George K. McKee. While the mechanism as disclosed in the above mentioned patent was a considerable improvement over the prior known structures the torque sensitivity was not up to that desired and the present invention is an improvement on the disclosure therein and in which the sensitivity more nearly approaches the desired torque control. By the present invention all of the advantages of the heretofore known step drilling machines are retained plus the extreme sensitivity to torque on the drill during the actual drilling or tooling operation.

It is, therefore, the principal object of the present invention to provide a step drilling machine in which the resistance on the drill to drill rotation effects the withdrawal of the drill from the work.

Another object of this invention is to provide a high speed or sensitive drill for deep hole or step drilling operations in which the drill is withdrawn at regular intervals for chip clearance and drill cooling in addition to the withdrawal of said tool or drill when the torque thereon approaches the breaking point of the drill.

It is also an object of this invention to provide a machine for accomplishing the foregoing objects which is economical to manufacture and comparatively simple in its operation.

A still further object of the present invention is the provision of a device for accomplishing the foregoing objects which can be adjusted whereby the sensitivity thereof may be varied depending upon the size of the drill, material of which the drill is made and the material being operated upon.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a front elevation of a high speed or sensitive drilling machine embodying the improvements of this invention.

Fig. 2 is a side elevation of the machine of Fig. 1 as seen from the right hand side of said Fig. 1.

Fig. 3 is a plan view of the spindle rotating and driving mechanism as seen from line 3—3 on Fig. 2.

Fig. 4 is a view partly in section and partly in elevation through the spindle drive as seen from line 4—4 on Fig. 3.

Fig. 5 is an enlarged sectional view of a portion of Fig. 4 and particularly illustrating the spindle driving mechanism as supported thereby.

Fig. 6 is a view partly in section and partly in elevation of the right hand side of Fig. 5 as seen from line 6—6 on said Fig. 5.

Fig. 7 is a view similar to Fig. 6 showing the parts in a second position from that of Fig. 6.

Fig. 8 is a transverse sectional view through the spindle driving mechanism as seen from line 8—8 on Fig. 5.

Fig. 9 is a top plan view of the spindle drive mechanism with the parts in the position illustrated in Figs. 5, 6 and 7.

Fig. 10 is a side elevational view of an enlarged scale of the spindle carrying head.

Fig. 11 is a top plan view of the tool head of Fig. 10.

Fig. 12 is an enlarged vertical sectional view through the spindle carrier as seen from line 12—12 on Fig. 1.

Fig. 13 is a transverse sectional view through the tool head taken on line 13—13 on Fig. 10.

Fig. 20 is a fragmentary vertical sectional view taken on line 20—20 on Fig. 10.

Fig. 21 is an enlarged fragmentary transverse sectional view illustrating the relative positions of the control torques as seen from line 21—21 on Fig. 10.

Fig. 25 is an enlarged sectional view through a part of the torque operating system taken on line 25—25 on Fig. 10.

Fig. 26 is a diagrammatic view depicting the complete hydraulic and electrical circuits utilized in effecting and controlling the movements of the drill or tool carrier.

Throughout the several views of the drawings, similar reference characters are employed to denote the same or similar parts.

Figure 14:
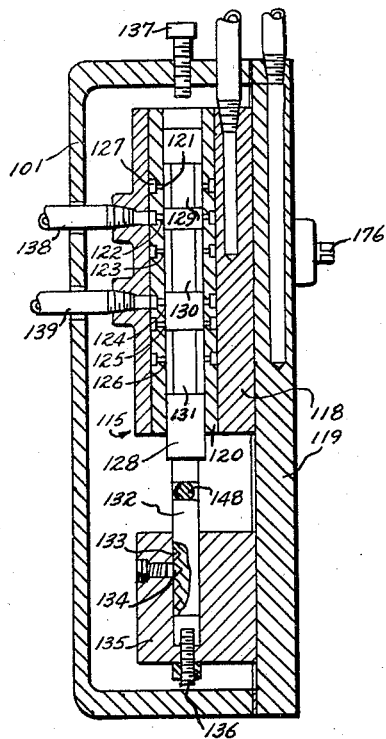
Fig. 14 is a vertical sectional view through the tool head taken on line 14—14 on Fig. 11 and illustrating the main control valve.

As was noted above, this invention pertains primarily to means or mechanisms for controlling the longitudinal or feed movement of a drill for performing step or deep hole drilling operations. In the embodiment of the invention herein disclosed there is provided a machine in which the tool or drill is advanced from an initial positon at a rapid rate to the work, fed at a slow rate through a part of the work and then retracted, followed by a rapid advance of the drill or tool to the point where it was previously withdrawn for a second drilling step whereupon reversal again takes place. This cycle of operation is repeated until the work is completely tooled or drilled. As was noted above, the purpose of this type of a control mechanism is to permit the clearing of chips from the holes so that they do not interfere with the rotation or operation of the drill or interfere or prevent maintaining the drill in a cool condition. In the case of drilling oil holes in crank shafts, this is very important since such drills are of comparatively small diameter and will not stand a great amount of strain. In this instance, the chips may interfere with the rotation of the drill, thereby setting up a torque on the drill in excess to that which it will stand, causing said drills to be twisted and broken.

By the present invention, means are provided whereby this torque is utilized for effecting the withdrawal of the drill from the hole. At the same time, these chips may not increase the torque on the drill but might interfere with the proper feeding of the drill, thereby causing same to become excessively hot, and means are therefore provided supplementary to the torque control means for periodically withdrawing the drill from the hole to provide for cooling of the drill.

The machine disclosed in the drawings is a single spindle machine, that is, a machine for drilling one hole at a time. It should be noted, however, that a multiple spindle machine may, and in fact has been, produced in which a plurality of drilling heads were employed, thereby simultaneously drilling a comparatively large number of holes, such as the oil holes for all of the bearings of a crank shaft as used in a multiple cylinder internal combustion engine, and in which each drilling head had incorporated therewith the control means to be presently described.

Specifically, the machine shown in the drawings comprises a base 25, from which rises a standard 26 having formed vertically of its front face a dovetail guide 27 having mounted thereon a work supporting table 28. Any suitable means (not shown) may be provided for adjusting the work table 28 relative to the guide 27 and for clamping the table in position. Mounted on the upper end of the standard 26 is a column 29 terminating at its upper end in a housing 30 for the spindle bearings and like mechanism.

The column 29, at its upper rear end, is provided with a pad 31 to which is secured a motor 32. Projecting from the motor 32 is the motor shaft 33 which projects into a hollow cover cap 34 secured to the housing 30. The motor shaft 33 has keyed or otherwise secured to it a pulley 35 for a belt 36. The belt 36 is in turn extended around the spindle pulley 37, freely rotatable on anti-friction bearings 38 which encircle the spindle sleeve 39. The spindle sleeve 39 is journaled in anti-friction bearings 40 and 41 and is provided interiorly thereof with suitable driving keys which enter splines in a spindle 42.

The spindle pulley 37 is substantially cup shaped and encloses the anti-friction bearing 38. The inner race of the bearing 38 is placed under tension by a nut 43 which has its sleeve like portion 44 in contact with said inner race of anti-friction bearing 38. The nut 43 is connected with the spindle sleeve 39 through threads 45. The nut 43 includes an enlarged portion 46 which carries the driven means between the pulley 37 and spindle sleeve. As seen most clearly from Fig. 8 the nut portion 46 has projecting, radially, from equally spaced points around its periphery, three being shown, studs 47, 48 and 49 on each of which is mounted a driven cam or dog 50. Each of said cams or dogs 50 is substantially identical which, as seen in Figs. 5, 6 and 7 comprises a cylindrical member or roller 51 having at one point on its periphery a flat 52. Diagonally opposite the flat 52 the cam or dog is provided with a vertical shoulder or face 53 which terminates in an upwardly and outwardly inclining cam face 54. The dog is mounted on its stud 47, 48 or 49 through an anti-friction bearing 55.

Projecting upwardly from the hub 56 of the spindle pulley 37 is an abutment 57 in the nature of a roller secured to the pulley 37 through a threaded stud 58. There are as many abutments 57 as dogs 50. Each abutment 57 is positioned on the pulley 37 to be engaged by the vertical shoulder or face 53 of the cam or dog rollers 51.

Surrounding the spindle driving sleeve 39 is a plate 59 having its under surface 60 simultaneously resting on the flats 52 of each of the cams or dogs 50. Upstanding from the plate 59 is a short sleeve 61 which acts as a centralizing medium for a coiled spring 62 above the plate 59. The other end of the spring 62 is likewise centralized by a short sleeve 63 projecting downwardly from a nut 64 on the spindle sleeve 39.

The spring tensioning nut 64 is provided with a screw 65 having projecting therefrom a pin like portion 66 that enters the screw thread or spiral path 67 in the upper end of the spindle sleeve 39. The screw thread or spiral path 67 has a large lead whereby the nut may be rapidly advanced longitudinally of the spindle driving sleeve. The nut 64 is adapted to be actuated to the desired position and then secured in this position for which purpose it is split as at 68, see Fig. 9, having the split spanned by a suitable clamping screw 69.

Upstanding from the housing 30 is a post 70 having secured to its upper end, as by nuts 71, an angle bracket 72. The one leg 73 of the angle bracket 72 has secured to it a micro-electric switch 74 which has pivoted thereto one end of an arm 75. Projecting from the arm 75 is a plunger 76 to actuate the switch contacts within the micro-switch, not shown except diagonally in Fig. 26 where they are indicated by the reference numeral 77. The other end of the arm 75 is provided with a roller 78 which rides on the upper surface of the plate 59 as clearly illustrated in Figs. 5 and 7.

The motor 32 rotates in a clockwise direction as indicated by the arrow 80 on Fig. 3 which through the belt 36 correspondingly rotates the spindle sleeve pulley 37. The rotation of the spindle sleeve pulley 37 in a clockwise direction is to the left as seen in Figs. 5, 6 and 7 wherefore the abutments 57, from said pulley 37, will each engage its driven cam or dog 50 through their shoulders or vertical faces 53 to correspondingly rotate the nut 43 and thereby the spindle sleeve 39. The position of the parts illustrated in Figs. 5 and 6 is the normal or idle position and upon initial rotation of the spindle sleeve pulley 37 the cams or dogs 50 are slightly rotated about their individual studs 47, 48 and 49 to the position shown in solid lines in Fig. 7. In other words the flats 52 of each cam or dog 50 is slightly tilted from the horizontal to a downwardly inclined position as seen in Fig. 7 in solid lines which causes a slight compression in the spring 62. It is in this position of the parts that the spindle is being rotated during a drilling operation. The parts will be held in this position so long as the drill is freely cutting and has no torque or sticking pressure thereon greater than that which can be withstood by the drill.

Should, for some reason, the torque on the drill be increased due to a gathering of the chips in the hole being drilled or a swelling of the drill due to friction heat or for any other reason a resistance be set up to drill rotation, the driving spindle sleeve will tend to slow down in its rotation thereby tending to correspondingly slow down the rotation of the spindle sleeve pulley 37. Since the said spindle sleeve pulley is being constantly driven through the belt 36 the abutments 57 will constantly turn and will thereby cause the cams or dogs 50 to be rotated or oscillated about their studs 47, 48 and 49 from the solid line position of Fig. 7 to the phantom line position 81 thereof and will thereby raise the plate 59 from its solid line position in Fig. 7 to its phantom line position, indicated by the reference numeral 82, and correspondingly elevate the micro-switch arm 79 from its solid line position to its phantom line position 83. This immediately closes the contacts of the micro-switch to operate the control mechanism, to be later described, and withdraw the drill from the work.

It has ben found in actual tests that this control is an extremely accurate and sensitive one. For example use was made of a one-eighth inch drill rotating at 2750 R. P. M. and that in a maximum of ten revolutions of the drill the withdrawal took place. This withdrawal was effected in five one-hundredths (.05) of a second, the total time required to actuate the micro-switch and effect the said drill withdrawal. The break down of this time included twelve thousandths (.012) of a second for switch operation and twenty-nine thousandths (.029) of a second for solenoid operation, to be later described.

It is to be understood, of course, that this time may be varied depending upon the size of the drill and the materials being used and which variation is accomplished by adjusting the nut 64 to increase or decrease the tension in the spring 62, all as pointed out above.

From the foregoing it will now be appreciated that there has been provided a yieldable drive connection between a source of power and the spindle and which drive connection yields to excessive pressure on the drill due to an increase in torque thereon. It will further be appreciated that by adjusting the tension or yielding limit in this yieldable drive drill breakage can be so utilized that the drill is withdrawn in ample time to prevent the occurrence of drill breakage. It will further be appreciated that a high speed or sensitive drilling machine equipped with the yieldable drive just described will perform drilling operations of the step drilling type and the actual drilling performed until the point of breakage of the drill is nearly reached instead of withdrawing the drill when no danger exists.

The spindle 42 is mounted for rotation, at its lower end, in a quill 84, disposed for axial adjustment in a bore in a tool carrier 85, see Fig. 12. The upper end of the tool carrier 85 carried an anti-friction bearing 86 for the spindle 42. The lower extremity of the spindle 42 is provided with the usual chuck 87 for the drill or other tool.

The spindle 42 is axially adjustable relative to the carrier 85 by means of a rack pinion 88 carried by a shaft 89 rotatably journaled in the carrier 85. The rack pinion 88 meshes with a rack 90 formed integral with or secured to the quill 84. In order to rotate the pinion 88, its shaft 89 projects beyond the forward side of the carrier 85 and has secured thereto a knob or the like 91. The lower end of the carrier is split, and on each side thereof are lugs or ears 92 and 93, see Fig. 13, respectively provided with a tapped and a plane perforation receiving a clamping stud 94. This clamping stud draws the portions of the carrier on each side of the split 95 towards one another and thereby clamps the quill in adjusted positions.

The spindle carrier, and therefore the parts carried thereby, are actuated by hydraulic means toward and from the work, which means, as shown in Fig. 12, comprises a rearwardly projecting lug 96 on the carrier 85 which has a perforation therein receiving the lower, reduced end 97 of a piston rod 98. The piston rod 98 has secured to its upper end a piston 99 which is movable through a cylinder 100 secured in a bore in the tool head 101.

In order to prevent loss of fluid and pressure around the piston rod at its lower end, use is made of a suitably packed joint 102 carried by the lower cylinder head 103. The upper end of the cylinder 100 is likewise suitably closed by a head 104.

The spindle carrier 85 is guided in its movement relative to the tool head 101, see Fig. 11, by means of a dove-tailed guide 105 received in a correspondingly shaped guide-way 106 with a gib 107 between one side of the guide and the adjacent side of the guide-way. The tool head 101 is provided in its rear side with a dove-tailed guide-way 108 receiving a correspondingly shaped guide 109 formed on the forward face of the column 29. A gib 110 is disposed in the guide-way 108 between one side of the guide tongue 109 and the opposed side of said guide-way 108 for clamping the head in position on the said column 29.

As was noted above, hydraulic or fluid means is preferably employed for actuating the piston 99, and therefore the spindle carrier, toward and from the work. This hydraulic mechanism is shown diagrammatically in Fig. 26 to which reference is now to be had, and the various valves and control means will be described in detail with reference to their structural illustrations in the other figures of the drawings as they are encountered in a complete cycle of operation of the machine. As shown in Fig. 26, use is made of a tank or sump 111, which may be independent of the machine though preferably is formed in some part of the bed, such as in the base 25 and lower portion of the standard 26. Mounted above the tank or sump 111 is a constantly rotating pressure circulating pump 112 having its intake or suction side connected by a pipe 113 with the sump or tank. The discharge side of the pump has extending therefrom the pressure pipe or conduit 114, terminating in the main control mechanism indicated in general in Fig. 26 by the reference numeral 115. The pressure pipe or conduit 114 has connected therewith a branch pipe or conduit 116 which terminates in the sump or tank 111, and has intermediate its ends an adjustable relief valve 117. The relief valve 117 determines the actuating pressure in the system.

The main control valve 115 is structurally illustrated in Fig. 14 and comprises a valve block 118 secured to the inner face of a plate 119 which closes the open right hand end of the tool head 101, as seen in Figs. 1 and 14. Pressed into a suitable bore in the valve block 118 is a valve sleeve 120 having formed therethrough and radially thereof a plurality of sets of radial ports 121, 122, 123, 124, 125 and 126, each set of ports being encircled by a similar groove 127 formed circumferentially in the exterior of the sleeve 120. Disposed in the bore of the valve sleeve 120 is a spool type valve member 128 provided with reduced portions or cannelures 129, 130 and 131 adapted in different positions of adjustment to variously connect the several sets of ports in the valve sleeve 120.

The valve 128 has four operative positions, and in order to determine these positions, it has projecting therefrom a stem 132 provided with V-shaped notches 133 co-operating with a spring pressed detent 134 carried by a valve block 135. The valve block 135, similar to the valve block 118, is secured to the inner face of the plate 119, and therefore projects into the interior of the tool head 101. The position of the valve illustrated in the drawings is the neutral or stop position, and the valve has a position to the right of that shown in Fig. 26, or below that shown in Fig. 14, which is the retracting position. In order to limit the movement of the valve to the right in Fig. 26, and downwardly in Fig. 14, use is made of a stop screw 136 carried by the valve block 135 in alignment with the valve stem 132. A third position of the valve 128 is to the left of that shown in Fig. 26 and upwardly of that shown in Fig. 14, which is the slow feed position to cause the tool to feed slowly through the work while a cut is being effected. The fourth position of the valve is to the extreme left in Fig. 26, and extreme upper position in Fig. 14, which is the rapid downward position to cause a rapid approach of the tool to the work. This fourth position is finally determined by a stop screw 137 threaded into the upper wall of the tool head 101.

As seen in Fig. 26, the radial ports 122 and 124 have respectively connected with them one end of pipes or conduits 138 and 139 which respectively terminate at ports located at upper and lower ends of the piston cylinder 100. The ports 123 have connected therewith the upper end of the main pressure pipe or conduit 114, while the ports 121 and 126 have connected therewith pipes or conduits 140 and 141 which terminate in the sump or tank 111, and are, therefore, the return lines for the system from the main control valve mechanism. The remaining set of ports 125 of the piston valve sleeve 120 have connected therewith one end of a pipe or conduit 142 which terminates in a balance valve mechanism, indicated in general in Fig. 26 by the reference numeral 143, and which will be described in detail later.

At the commencement of a tooling cycle, the valve 128 is manually shifted by means of a lever 144, see Fig. 13, which is keyed or otherwise secured to the outer projecting end of a shaft 145 oscillatably journaled in a bushing 146 carried by the tool head cover plate 119. The inner, projecting, end of the shaft 145 has keyed or otherwise secured to it a lever 147 having at its free end a valve shifting pin 148 received in a slot 149 formed in the valve stem 132. This initial shifting of the valve member 128 is to the extreme left in Fig. 26 and extreme upper position in Fig. 14 for thereby connecting the pressure ports 123 with the ports 122 and causing a flow of fluid from the conduit 114 to the conduit 138, and therefore the upper end of the cylinder 100 for actuating the piston 99 downwardly together with the parts connected therewith. The fluid beneath the piston 99 is at this time being exhausted by way of pipe or conduit 139 to the ports 124 and 126 and to the pipes or conduits 141 and 140 to the sump or tank 111. As was noted above, this movement of the piston and parts connected therewith is at a rapid rate in a downward direction or toward the work.

Figure 24:
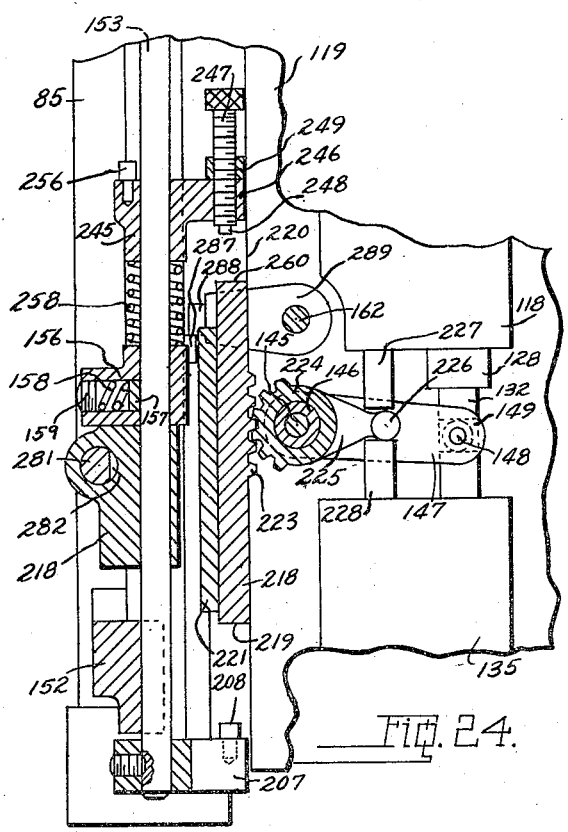
Fig. 24 is an enlarged fragmentary vertical sectional view through the tool head as seen from line 24—24 on Fig. 13.
Figure 19:
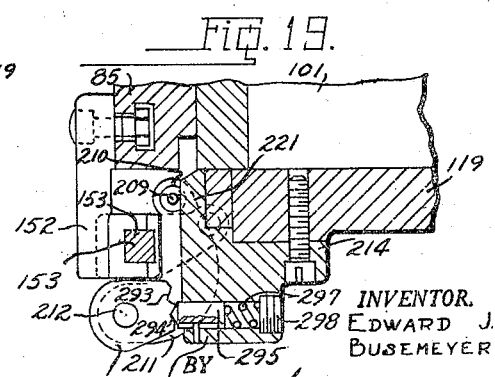
Fig. 19 is a fragmentary transverse sectional view through the tool head taken on line 19—19 on Fig. 10.

The rapid downward or advance movement of the carrier continues until the drill or tool is about to strike the work, whereupon this movement is changed to a relatively slow feed rate of movement. In order to accomplish this, the tool carrier 85 is provided therein with a T-shaped slot 150, see Fig. 11, which extends the length of the carrier and has secured therein at its upper end a bracket or arm 151, and at its lower end a bracket or arm 152, see Fig. 19. Carried by the brackets or arms 151 and 152 is a rod or bar 153, shown in the drawings as of angular cross section. Mounted on this rod is the cumulative rapid traverse stop dog 154 which, as seen in Fig. 10, is provided with a cam shaped nose 155 on one side of the rod 153, and as seen in Fig. 24 with a cylindrical boss 156 on the other side of said rod 153. The boss 156 is hollow to accommodate a friction shoe 157 backed up by a spring 158 whose tension may be adjusted by screw 159. The cam nose 155 provides an inclined cam face 160 for engagement with a flipper dog 161. The flipper dog 161, as seen in Figs. 10 and 20, is secured to the outer end of a stud 162 oscillatably journaled in the tool head plate 119. The flipper dog 161 is provided with a notch 163 receiving the ball end of a projection 164 extending from the lever 144.

From this, it will be seen that the cumulative rapid traverse stop dog 154 is adjustably positioned on the rod 153 to engage the flipper dog 161 at the point where the drill or tool is about to engage the work. The oscillation of the flipper dog 161 in a counterclockwise direction, as seen in Fig. 10, actuates the lever in a clockwise direction, which through the shaft or stud 145 and arm 147, shifts the valve member 128 to a position for cutting off the flow of the exhaust fluid through the pipe or conduit 139 and therefore the unrestricted port 124. This flow is directed, instead, from the pipe or conduit 139 to the feed rate determining valve, indicated in general in Fig. 26 by the reference numeral 165.

Figure 16:
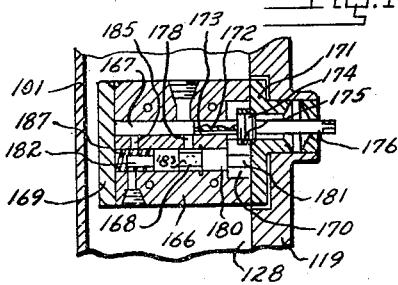
Fig. 16 is a fragmentary sectional view through the tool head taken on a plane behind that of Fig. 14 on line 16—16 on Fig. 11.

This feed determining valve 165 is shown structurally in Fig. 16, and comprises a valve block 166 secured to the rear side or end of valve block 128, as shown in dotted lines in Fig. 11. The valve block 166 is provided therethrough with a pair of bores 167 and 168, one end of each of which is closed by a plate 169, while the other ends are in communication with a chamber 170. This chamber 170 is in turn closed by a plate 171 secured to the block 166. Disposed in the valve block bore 167 is a valve member 172 having an inclined groove 173 formed longitudinally in one side thereof. The valve member 172 is provided adjacent one end of its groove with an enlarged threaded portion 174 threaded into an aperture 175 formed through the closure plate 171. Projecting from the threaded portion 174 is the valve stem 176, having its end provided with a portion to receive a suitable wrench, key or the like whereby the valve may be turned to effect its adjustment through its enlarged threaded portion 174.

The most shallow portion of the groove 173 is adjacent to the chamber 170 and establishes the minimum rate of flow from this chamber. From this, it will be seen, that the greater the depth of the groove 173 that is in communication with the chamber 170, the faster the flow from this chamber, and that the position of this groove with respect to the chamber 170 is determined by the adjustment of the threaded portion 174 on the valve stem 172 and therefore the rate of flow of the fluid and the rate of feed of the drill or tool. This chamber 170 is shown diagrammatically in Fig. 26 as a port 170' to which is connected one end of a pipe or conduit 177 which has its other end connected with the pipe or conduit 139 from the lower end of the cylinder 100.

The valve block 166 is shown as provided with a port 178 between the valve block bores 167 and 168. This port 178 is diagrammatically illustrated in Fig. 26 as a pipe or conduit 179 connecting the valve bore 167 ahead of the valve member 173 with the bore 168 which contains the balance valve mechanism, indicated in general in Fig. 26 by the reference numeral 143.

The balance valve mechanism 143 is illustrated structurally in Fig. 16, and comprises a valve member 180 disposed in the valve bore 168 of valve block 166 and which valve member has reduced stem portions 181 and 182 at opposite ends thereof, together with a reduced central portion or cannelure 183. This reduced portion or cannelure controls the flow through a port, shown most clearly in Fig. 26 by the reference character 184, with which is connected the pipe or conduit 142. The valve block 146 is shown in Fig. 16 as having a second port 185 connecting the valve bores 167 and 168, this port being diagrammatically shown as a conduit 186 in Fig. 26, and connects the space ahead of the valve member 172 with the space ahead of the valve member 180. The space ahead of the valve member 180, and including the reduced portion 182, includes a spring 187 which surrounds the said reduced valve portion 182 and abuts against the closure plate 169 for urging the valve member 180 to the right, as seen in Fig. 16, or downwardly as seen in Fig. 26, maintaining the port 184 normally open. As will be seen in Fig. 16, the fluid chamber 170 is at all times in communication with the end of the valve member 180, and this chamber is illustrated in Fig. 26 by means of a port 170" with which is connected one end of a pipe or conduit 188 which has its other end connected with the pipe or conduit 139.

The operation of the balance valve mechanism is well understood, its purpose being to maintain a constant flow of fluid through the system when the tool is being actuated through a slow or feeding cycle. This flow from the exhaust pipe or conduit 139 from the cylinder 100 is by way of the pipes or conduits 177 and 188 to the chamber 170 where it acts on the balance valve 180, for actuating it against the resistance of spring 187, and flows through the groove 173. The flow through the groove 173 is through the ports 178 and 185 respectively and pipes or conduits 179 and 186. The flow through the port 185 or pipe or conduit 186 combines with the yieldable urge of the spring 187 for shifting the valve against the pressure in chamber 170 and therefore opening the port 184 an amount equal to the balance in pressure at the two ends of the valve as determined by the adjustment of the valve member 172. This flow through the port 184 is into the pipe or conduit 142 to the main control valve mechanism 115 where it is connected with the pipes or conduits 141 and 140 and the sump or tank 111.

The slow feeding movement of the tool continues until the tool carrier is reversed for withdrawing the tool from the work. The reversal of the tool carrier may be accomplished through either of two instrumentalities, either after a definite amount of slow feed has taken place, or when the torque on the drill reaches a point near the safe torque load on the drill.

Since the torque drive on the spindle and its control have been previously described its connection with the operating mechanism will first be disclosed.

Within the microswitch housing is a pair of fixed contacts shown diagrammatically in Fig. 26 and indicated by the reference numeral 189. As shown in Fig. 26 the movable contacts 77 have respectively connected therewith the power lines 190 and 191 of an electrical supply, while the fixed contacts 189 have respectively connected therewith wires 192 and 193 respectively connecting the opposite end of the winding of the coil of solenoid 194.

The solenoid 194, as seen in Fig. 10, is secured to the lower end of tool head plate 119 and has the core 195 projecting therefrom. The upper end of the core 195 is pivotally connected at 196 with a link 197. The upper end of the link 197, in turn, is pivotly connected at 198 with an extension 199 of the manually operating lever 144.

It should be noted that the spindle rotating or driving belt 36 is tensioned to the point of continuing drill rotation to at least the point of drill breakage so that any slowing down in spindle rotation is caused by excessive torque on the drill. For this purpose the slack side of the belt has contacting therewith the idler or tensioning pulley or roller 200 rotatably mounted at the free end of an arm 201 oscillatably mounted on a stud 202 carried by and upstanding from the housing 30. Also mounted on the stud 202 and connected with the arm 201 is a segmental gear 203 having its teeth enmeshed with a worm 204 on the inner end of a worm shaft 205. The worm shaft 205 is rotatably journaled in suitable bearings provided by the housing 30 and which shaft 205 has secured to its projecting free end an operating knob 206.

From the foregoing it will now be seen that a slowing down of the spindle 42 due to an increase in torque on the drill or other tool which causes the closing of the microswitch contacts 77 and 181 will operate the solenoid 194 and thereby shift the main control valve mechanism 115 to the right, as seen in Fig. 26, and effect thereby a rapid retraction of the piston 99 and parts carried thereby. It is believed obvious that the shifting of the main valve mechanism 115 will effect this operation since the pressure in pipe or conduit 114 will be connected with the pipe or conduit 139 and the under side of the piston 99. The exhaust fluid from the other side of the piston 99 flows through pipe or conduit 138 to the pipe or conduit 140 and the sump 111.

The rapid retraction of the spindle carrier and parts associated therewith continues until the carrier is reversed to again descend to work drilling position. The means and mechanism disclosed in the drawings for effecting this reversal includes an arm 207, secured to the lower end of the dog rod 153. The arm 207 has upstanding from its free end an abutment pin 208 adapted to engage the lower end of a pin 209, illustrated most clearly in Figs. 10 and 25. The pin 209 is mounted in a cylindrical portion or housing 210, at the end of an arm 211 pinned or otherwise secured to an oscillatable rod 212. The rod 212 is journaled for oscillation at its upper end in a bracket 213 carried by the tool head plate 119, and is further journaled at its lower end in a bracket 214, likewise carried by the tool head plate 119. As will be seen from Fig. 25, the housing 210 is provided at its lower end with a shoulder 215 on which rests an enlarged collar 216 of the pin 209. A coil spring 217 surrounds the pin 209 and abuts with the collar 216 for maintaining the pin in its normal lower position. The normal position of the pin 209 is in line with the pin 208 and a valve actuating slide 218, the lower end 219 of which it engages during the upward movement of the spindle carrier for thereby upwardly shifting the said slide 218, as seen in Fig. 24.

The slide 218 is adapted to slide against the face 220 of the head plate 119 of the tool head 101. The slide 218 is retained in position by a flange 221 projecting from a bracket 222 secured to the head plate 119. This slide 218 is provided intermediate its ends with rack teeth 223 meshing with a segmental gear 224, rotatably mounted on the bushing 146 carried by the tool head plate 119.

The segmental gear 224 has projecting rearwardly therefrom an arm 225 provided at its rear end with a circular head 226 contacting on opposite sides thereof with valve stems 227 and 228. The valve stems 227 and 228 are associated with valve mechanisms which operate pistons for shifting the main control valve member 128, and these valve members are respectively shown diagrammatically in Fig. 26 where they are respectively indicated in general by the reference characters 229 and 230.

This upward movement of the valve slide 218, through its rack teeth 223, oscillates the arm 225 for shifting the valve stem 228 of valve mechanism 230. The valve mechanism 230, as noted above, is shown diagrammatically in Fig. 26 and is shown structurally in Fig. 15. The valve stem 228 has connected therewith a valve member 231 having intermediate its ends a reduced portion or cannelure 232. Below the cannelure 232, the valve stem 231 is provided with a counterbore in which is disposed one end of a coil spring 233, which has its other end seated in the counterbore of a plug 234 in the end of the bore in the valve block 135 which accommodates the valve 231. The valve member 231 is provided with a flange 235 to engage a shoulder 236 to limit the movement thereof by the spring 233.

As shown in Fig. 26, the reduced portion or cannelure 232 normally connects ports 237 and 238, and when operated by the arm 225, connects the ports 238 and 239. The port 239 has connected therewith one end of a branch pressure pipe or conduit 240, while the port 237 has connected therewith one end of a pipe or conduit 241, which terminate in the sump or tank 111. The remaining port 238 has connected therewith one end of a pipe or conduit 242, terminating at its other end in a cylinder 243. While the connection between the ports of the valve mechanism 230 is illustrated, in Fig. 26, as pipes or conduits, they are in fact merely cross-drilled ports in the valve block 135.

The cylinder 243 is in effect a cylindrical bore in valve block 135, which has disposed therein a piston 244, engaging the undersurface of the valve shifter arm 147. The operation of the piston 244 shifts the main control valve 128 to its extreme left hand position, thereby connecting the pressure in the pipe or conduit 114 with the top of the cylinder 100 for actuating the piston 99 therein downwardly at a rapid rate. The fluid ahead of the piston 56 is forced through the pipe or conduit 139, to the main control valve 128, where it is connected with the pipes or conduits 140 and 141 and the sump or tank 111, thereby rapidly advancing the tool to the work.

From the foregoing, it will now be noted that the dog 207, through its pin 208 and the intermediate pin 209, reverse the movement of the tool carrier. It should be noted at this time that this reversal took place at a point short of the initial position of the tool carrier, and from which initial position the carrier was actuated by the manual operation of the lever 101, all as will be later made clear.

The rapid advance of the tool carrier 85 continues downwardly until the rapid traverse cumulative dog 154 through its nose 155 engages the flipper dog 161 and shifts the main control valve 128 to the slow feed position, whereupon, the tool carrier advances at a slow rate, as above described. This slow movement of the tool carrier continues until the torque control mechanism again withdraws the tool or until a definite amount of tooling or drilling has taken place, for example, one inch or more. In order to reverse the tool carrier and withdraw the drill from the work after a pre-determined amount of drilling has taken place, the following mechanism is employed.

Figure 22:
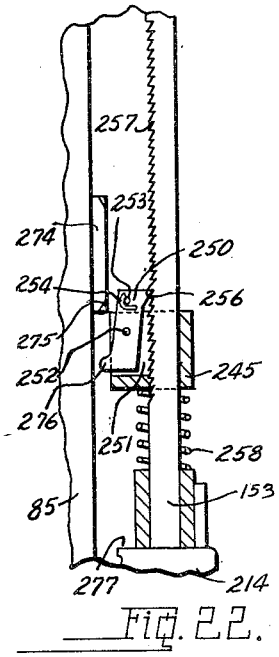
Fig. 22 is a vertical fragmentary view partly in section and partly in elevation through the control torques as seen from line 22—22 on Fig. 10.

Mounted on the dog rod or bar 153, as seen in Figs. 10, 22 and 24, is a slow feed dog 245 having projecting from one side thereof an arm 246 into which is threaded a dog screw 247 having a nose 248. The dog screw 247 is locked into adjusted position by lock nut 249. The adjustment of the dog screw 247, and the distance between the end of its nose 248 and the end of cam nose 155 of the cumulative rapid traverse dog 156, determines the amount of drilling or the amount of slow feed movement imparted to the tool carrier before reversal thereof. This feed dog 245 is loosely mounted on the dog rod 153 and is connected thereto by means of a pall 250 disposed in a slot 251 formed in the dog 245 and pivotly connected by means of pivot 252. The upper end of the pall 250 has projecting therefrom a pin 253 to which is connected one end of a spring 254 which has its other end connected with a second pin 255 projecting from the dog 245, see Fig. 21. This spring maintains the pointed nose 256 of the pall 250 in engagement with ratchet teeth 257 formed on the inner face of the dog rod 153. From the foregoing, it will be seen that even though the feed dog 245 is loosely or slidably mounted on the dog rod 153, it is positively and mechanically connected therewith. The feed dog 245 is maintained in definite spaced relation with the cumulative rapid traverse dog by means of a spring 258 disposed around the dog rod 153 and abutting at opposite ends with said dogs. In order to maintain said dogs in spaced relation with one another, use is made of a tie rod or bolt 259 which has its lower end threaded into the rapid traverse dog and its upper end passing through a plane perforation in the said feed dog with a head at the upper end of the tie rod or bolt 259 engaging the upper surface of feed dog 245.

When the tool carrier reaches the end of the pre-determined amount of drilling the nose 248 of the dog screw 247 engages the upper end 260 of valve actuating slide 218 and causes a downward shifting thereof. This downward movement of the valve slide 218 through its rack teeth 223 rotates the segmental gear 224 to cause an upward oscillation of its arm 225 which through the enlarged ball end thereof actuates the valve stem 227 of valve mechanism 229.

Figure 15:
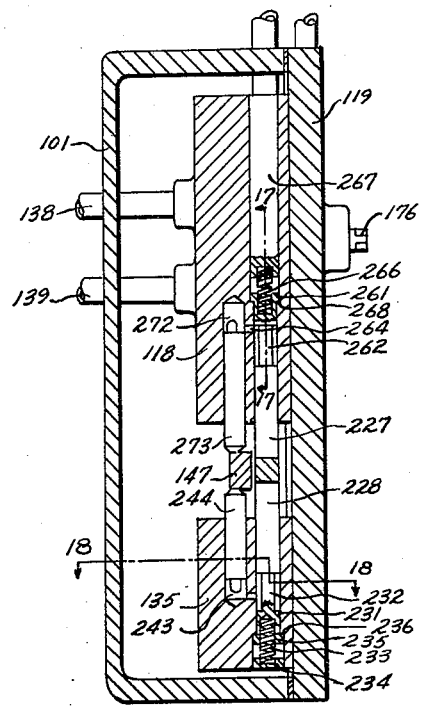
Fig. 15 is a transverse sectional view through the tool head taken on a plane ahead of that of Fig. 14 on line 15—15 on Fig. 11.
Figure 17:
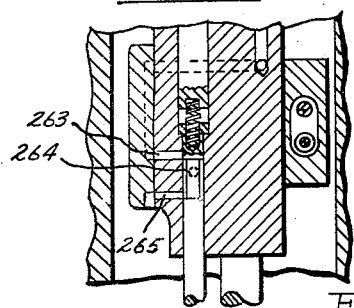
Fig. 17 is a fragmentary vertical sectional view through a part of the control mechanism taken on line 17—17 on Fig. 15.
Figure 18:
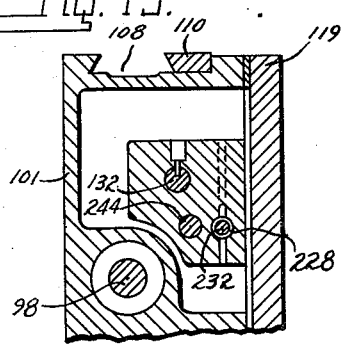
Fig. 18 is a fragmentary transverse sectional view through the tool head taken on line 18—18 on Fig. 15.

The valve mechanism 229 is illustrated structurally in Figs. 15 and 17 and comprises a valve member 261 integral with the valve stem 227 which has a reduced portion or cannelure 262 intermediate the ends thereof. The valve member 261 is mounted in a bore in the valve block 118, which is provided with three ports 263, 264 and 265. The valve member 261 is adapted, when in the position shown, to connect the ports 264 and 265, and when in its second position, to cut off the port 265 and connect the ports 264 and 263. The valve is shifted to the position shown by means of a spring 266 disposed in a counterbore in the upper end of the valve member, having its other end seated in a counterbore in a plug 267 secured in the upper end of the valve bore. It should be noted at this time that the plug 267 is of a slightly greater diameter than the valve member 261, thereby providing a shoulder 268 against which an enlarged collar portion of the valve member 261 engages to limit the movement of the valve member by the spring 266. As seen in Fig. 26, the port 263 has connected therewith one end of a branch pressure pipe or conduit 269 which extends from the main pressure pipe conduit 114, while the port 265 has connected therewith one end of a drain pipe or conduit 270, which terminates at the sump or tank 111. The remaining port 264 is illustrated in Fig. 26 as a pipe or conduit 271 and terminates in a cylinder 272. This cylinder is illustrated in Fig. 15 as a bore in which is mounted a piston 273 which has its lower end in contact with the upper surface of valve shifting arm 147.

From the foregoing it will now be seen that engagement of the dog screw 247 with the slide 218 causes same to actuate the arm 225 and shift valve 261, thereby connecting pressure in the pressure line 114 through the pipe or conduit 269 and cannelure or reduced portion 262 with the pipe or conduit 271 and cylinder 272, for actuating the valve arm 147 for shifting the main control valve member 128 to its extreme right hand position, as seen in Fig. 26. The shifting of the valve member 128 to its right hand position connects the pressure in the pipe or conduit 114 with the pipe or conduit 139, thereby elevating the piston 99, and parts connected therewith, at a rapid rate. The fluid ahead of the piston 99 is exhausted by way of the pipe or conduit 138, main control valve 128 and pipe or conduit 140 to the sump or tank 111.

It should be here noted that during the slow or feed movement of the tool carrier the feed dog 245 was actuated toward the cumulative rapid traverse stop dog 156 and that the frictional connection of the cumulative rapid traverse stop dog 156 causes the feed dog to move upwardly with the carrier and that the said cumulative rapid traverse stop dog is therefore now positioned on the dog rod or bar 153 at a point where the previous slow movement or drilling of the work stopped.

During this upward movement of the carrier, whether caused by the torque control mechanism or by the feed dog, a cam plate 274, carried by the tool head and having a cam 275 thereon, engages a lug or knob 276 on the feed dog latch or pawl 250 for actuating same about its pivotal mounting 252 for disengaging its nose 256 from the rack teeth 257. Upon the disconnection of the feed dog 245 from the dog bar 153, the spring 258, compressed during the previous slow feed movement of the carrier, expands for separating the cumulative rapid traverse stop and feed dogs an amount determined by the connecting pin or bolt 259 and again positions the feed dog to permit its subsequent operation. It will be appreciated, of course, that this feed dog may not have operated to reverse the carrier, which may have been accomplished by the torque controlling mechanism, but, nevertheless, the feed dog was actuated toward the cumulative stop dog whose movement was arrested by engaging the top face or surface 277 of the bracket 214 immediately after the operation of the flipper 161.

After each rapid retraction of the tool carrier, whether caused by the torque control or slow feed dog, the rapid downward movement of the carrier, and parts carried thereby, continues until the cumulative stop dog, through its cam 155 again shifts the flipper 161 for slowing down the movement of the carrier to a feeding rate. The feed then continues until the drilling distance, as established by the spacing of the feed dog nose 248 from the cumulative stop dog nose 155, has taken place, or until the torque on the drill reaches the point for substantially slowing down the rotation of the tool or drill spindle, so that its microswitch contacts 77, and 189 closes, whereupon the carrier is reversed to retract the tool from the work and effect a clearing of the chips from the hole being bored and a drenching of the tool or drill with coolant.

This cycle of operation is repeated continuously until the hole is completely bored through, whereupon the parts are returned to their initial position and the movement of the tool carrier stopped.

The mechanism for returning the carrier to its initial position, and stopping the mechanism, comprises a cam dog 278, see Fig. 1, which has a cam face 279 and is adjustably positioned in the T-slot 150 in the carrier. This dog 278 is adjusted to the point where it comes into operation after the work has been completely bored, and is adapted to engage the end 280, see Fig. 23, of a short rack 281 mounted for transverse movement in the bracket 214. The rack 281 has its teeth 282 meshed with a pinion 283, keyed or otherwise secured to the rod 212, which, as noted above, carries at its lower end the arm 211. This rod 212, in addition, has secured thereto a resetting member 284, see Figs. 10 and 21, having a lug 285 adapted to overlie a lug 286 projecting from the side of the cumulative rapid traverse stop dog 156.

Figure 23:
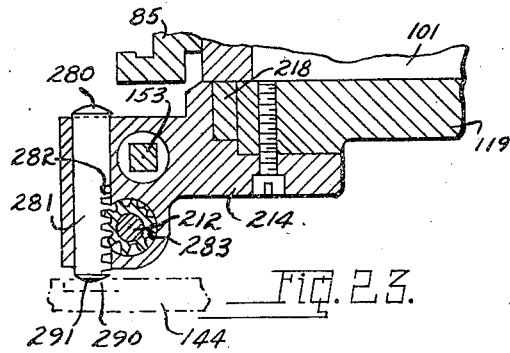
Fig. 23 is a fragmentary enlarged transverse sectional view through a part of the torque control mechanism as seen from line 23—23 on Fig. 10.

When the tool or drill of the carrier has completely bored the hole being drilled, the cam dog 278 shifts the rack 281 outwardly, as seen in Fig. 23, or to the right, as seen in Fig. 1, thereby oscillating the rod 212. This oscillation of the rod 212 carried with it the arm 211 and removes the intermediate pin 209, carried by its outer end, from the path of movement of the dog pin 208, so that the upward movement of the cam slide 218 cannot be effected. This then permits the carrier to travel beyond the point where it is normally reversed by the dog 207. In order to stop the carrier at its upper limit of movement, it has projecting from it, see Fig. 24, a pin 287, which engages the projecting end 288 of an arm 289 keyed or otherwise secured to the inner end of the flipper dog stud or shaft 162, as seen in Fig. 20. This stud or flipper dog shaft 162 is connected, through the seat and lug 163 and 164, with the lever 144, and therefore the valve member 128, for shifting the valve to its stop or neutral position. In order to initiate further operation of the machine, it is necessary to shift the valve to position by the lever 144.

The oscillation of the rod 212, as above described, also shifts the resetting member 284 to the position to cause the projection 285 to overlie the cumulative stop dog lug 286 and thereby hold the said dog relative to the dog bar 153 during this final upward movement of the carrier, and thereby positioning the cumulative rapid traverse stop dog to its initial position for a subsequent operation of the machine. The repositioning of the cumulative rapid traverse stop dog through its connecting pin or bolt 259, correspondingly positions the feed dog 246 on the dog bar. The operation of the handle or lever 144, for starting up the machine, effects the oscillation of the rod 212, so as to free the cumulative stop dog from its resetting member 284, as well as to position the pin 209, for subsequently reversing the direction of movement of the tool carrier. This resetting of the parts takes place through a cam 290, on the lever 144, which engages the end 291 of the rack 281 for shifting it in a direction reverse to that in which it was shifted by the cam dog 278.

In order to hold the rod 212 in either of its two operative positions, it has keyed or otherwise secured to it, at a point below the bracket 214, a detent plate 292, provided in its one end with a pair of notches 293 and 294, which co-operate with a spring pressed detent 295. The detent member 295 is disposed in an enlarged bored portion 296 of the bracket 214 which contains a spring 297 abutting on its inner end with the detent 295, and on its outer end with a plug 298.

From the foregoing, it will now be appreciated that there has been provided a deep hole or step drilling machine, in which the tool is actuated through repeated cycles of a rapid movement toward the work, a slow movement through a portion of the work, and a rapid movement from the work. The control of this cycle is dependent largely on the torque on the drill or tool during its operation, which control may be supplemented by means for periodically clearing the hole of chips to insure accuracy in drilling, and ultimate safety of the drill. It will be appreciated that the idle time of machines as heretofore known and used has been greatly reduced, while the mechanism is held to ultimate simplicity when considering the necessarily involved circuit.

What is claimed is:

1. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, and a yieldable coupling between the pulley and the sleeve for permitting continued pulley rotation while spindle rotation is retarded by torque thereon and automatically re-establishing spindle and pulley unitary rotation upon removal of torque on the spindle, including a plurality of driving dogs upstanding from said pulley, a rockable driven dog and cam member carried by the spindle driving sleeve in driving engagement with each of said pulley driving dogs, and a spring tension device for holding the said driven dog and cam members against rocking and in operative positions during normal torque on the spindle driving sleeve.

2. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and the sleeve for permitting continued pulley rotation while spindle rotation is retarded by torque thereon and automatically re-establishing spindle and pulley unitary rotation upon removal of torque on the spindle, including a plurality of driving dogs upstanding from said pulley, a rockable driven dog and cam member carried by the spindle driving sleeve in driving engagement with each of said pulley driving dogs, and a spring tension device for holding the said driven dog and cam members against rocking and in operative positions during normal torque on the spindle driving sleeve, a movable spindle carrier rotatably supporting the spindle for movement relative to the driving sleeve toward and from work, means moving said spindle carrier, and means operable upon rocking of said rockable dog and cam members operating the spindle carrier moving means to retract the spindle and tool from the work.

3. In a drilling machine of the class described a spindle drive comprising a prime mover, a spindle, a driving sleeve splined to said spindle, means supporting said driving sleeve for rotation, a pulley freely rotatable on said sleeve, a power transmission member between the prime mover and sleeve pulley, a yieldable coupling between the pulley and the sleeve for permitting continued pulley rotation while spindle rotation is retarded by torque thereon and automatically re-establishing spindle and pulley unitary rotation upon removal of torque on the spindle, including a plurality of driving dogs upstanding from said pulley, a rockable driven dog and cam member carried by the spindle driving sleeve in driving engagement with each of said pulley driving dogs, and a spring tension device for holding said driven dog and cam members against rocking and in operative positions during normal torque on the spindle driving sleeve, a movable spindle carrier rotatably supporting the spindle for movement relative to the driving sleeve toward and from work, means moving said spindle carrier, electromagnetic means for operating the last mentioned means, and a control switch operable by and upon the rocking of the dog and cam members for energizing the electromagnetic means and cause a retraction of the tool carrier from the work.

4. In a drilling machine of the class described a spindle drive comprising a prime mover, a spindle, a driving sleeve splined to said spindle, means for supporting said driving sleeve for rotation, a pulley freely rotatable on said sleeve, a power transmission member between the prime mover and sleeve pulley, a yieldable drive connection between the pulley and the sleeve for permitting continued pulley rotation while spindle rotation is retarded by torque thereon and automatically re-establishing spindle and pulley unitary rotation upon removal of torque on the spindle, including driving dogs or abutments upstanding from said pulley, cooperating driven dogs carried by the spindle driving sleeve, said driven dogs being movable mounted whereby they may be displaced upon increase in torque on the spindle driving sleeve, a spring operable for holding said driven dogs in operative positions during normal torque on the spindle driving sleeve, means for establishing said normal torque, a spindle carrier for mounting the spindle for movement relative to the driving sleeve toward and from work, means for actuating said spindle carrier, electromagnetic means operable by said displaced driven dogs upon displacement thereof for operating the tool spindle carrier actuating means to retract the spindle and tool from the work, and means operable by the carrier after the electromagnetic means has been deenergized for actuating the tool carrier toward the work.

5. In a drilling machine of the class described a spindle, a sleeve splined to said spindle, means supporting said sleeve for rotation, a pulley freely rotatable on the sleeve, a prime mover, power transmission means between the prime mover and pulley, a plurality of driving dogs projecting from said pulley, a plurality of rockable dog and cam members for and having a shoulder in abutment with each pulley driving dog, a radial pin for each dog and cam member projecting from said sleeve on which said dog and cam members are rockably mounted, and a spring tensioning device for holding said dog and cam members against rocking movement except under overload torque on the spindle.

6. In a drilling machine of the class described a spindle, a sleeve splined to said spindle, means supporting said sleeve for rotation, a pulley freely rotatable on the sleeve, a prime mover, power transmission means between the prime mover and pulley, a plurality of driving dogs projecting from said pulley, a plurality of rockable dog and cam members for and having a shoulder in abutment with each pulley driving dog, a radial pin for each dog and cam member projecting from said sleeve on which said dog and cam members are rockably mounted, and a spring tensioning device for holding said dog and cam members against rocking movement except under overload torque on the spindle, and said dog and cam members each including a cam face on which the spring tensioning device operates.

7. In a drilling machine of the class described a spindle, a sleeve splined to said spindle, means supporting said sleeve for rotation, a pulley freely rotatable on the sleeve, a prime mover, power transmission means between the prime mover and pulley, a plurality of driving dogs projecting from said pulley, a plurality of rockable dog and cam members for and having a shoulder in abutment with each pulley driving dog, a radial pin for each dog and cam member projecting from said sleeve on which said dog and cam members are rockably mounted, and a spring tensioning device for holding said dog and cam members against rocking movement except under overload torque on the spindle, said dog and cam members each including a cam face on which the spring tensioning device operates, a movable spindle carrier rotatably suppporting the spindle for movement relative to the sleeve toward and from work, means for moving said spindle carrier, and means operable upon rocking of said rockable dog and cam members for operating the spindle carrier moving means to retract the spindle carrier and spindle from the work.

8. In a drilling machine of the class described a spindle, a sleeve splined to said spindle, means supporting said sleeve for rotation, a pulley freely rotatable on the sleeve, a prime mover, power transmission means between the prime mover and pulley, a plurality of driving dogs projecting from said pulley, a plurality of rockable dog and cam members for and having a shoulder in abutment with each pulley driving dog, a radial pin for each dog and cam member projecting from said sleeve on which said dog and cam members are rockably mounted, and a spring tensioning device for holding said dog and cam members against rocking movement except under overload torque on the spindle, said spring tensioning device including a plate in contact with the cam faces of the dog and cam members, a spring holding said plate in contact with said rockable dog and cam members faces displaceable upon rocking of said dog and cam members, a movable spindle carrier rotatably supporting the spindle for movement relative to the sleeve toward and from work, said spindle carrier having a definite stroke length, means including control means moving said spindle carrier, electromagnetic means effecting the operation of the control means, and a switch operable by the spring tensioning device plate upon displacement thereof for energizing the electromagnetic means.

9. In a drilling machine of the class described a spindle, a sleeve splined to said spindle, means supporting said sleeve for rotation, a pulley freely rotatable on the sleeve, a prime mover, power transmission means between the prime mover and pulley, a plurality of driving dogs projecting from said pulley, a plurality of rockable dog and cam members for and having a shoulder in abutment with each pulley driving dog, a radial pin for each dog and cam member projecting from said sleeve on which said dog and cam members are rockably mounted, and a spring tensioning device for holding said dog and cam members against rocking movement except under overload torque on the spindle, said spring tensioning device including a plate in contact with the cam faces of the dog and cam members, a spring holding said plate in contact with said rockable dog and cam members faces displaceable upon rocking of said dog and cam members, a movable spindle carrier rotatably supporting the spindle for movement relative to the sleeve toward and from work, said spindle carrier having a definite stroke length, means including control means moving said spindle carrier, electromagnetic means effecting the operation of the control means, a switch operable by the spring tensioning device plate upon displacement thereof for energizing the electromagnetic means, and additional dog means on the tool carrier actuating the control member to a position to cause the spindle carrier moving means to retract the spindle carrier from the work.

10. In a drilling machine of the class described a spindle, a sleeve splined to said spindle, means supporting said sleeve for rotation, a pulley freely rotatable on the sleeve, a prime mover, power transmission means between the prime mover and pulley, a plurality of driving dogs projecting from said pulley, a plurality of rockable dog and cam members for and having a shoulder in abutment with each pulley driving dog, a radial pin for each dog and cam member projecting from said sleeve on which said dog and cam members are rockably mounted, and a spring tensioning device for holding said dog and cam members against rocking movement except under overload torque on the spindle, said spring tensioning device including a plate in contact with the cam faces of the dog and cam members, a spring holding said plate in contact with said rockable dog and cam members faces displaceable upon rocking of said dog and cam members, a movable spindle carrier rotatably supporting the spindle for movement relative to the sleeve toward and from work, said spindle carrier having a definite stroke length, means including control means moving said spindle carrier, electromagnetic means effecting the operation of the control means, a switch operable by the spring tensioning device plate upon displacement thereof for energizing the electromagnetic means, additional dog means on the tool carrier actuating the control member to a position to cause the spindle carrier moving means to retract the spindle carrier from the work, and means operable by the spindle carrier at the end of its stroke actuating the control member to a position to cause the spindle carrier moving means to retract the spindle carrier from the work.

11. In a drilling machine of the class described a spindle, a sleeve splined to said spindle, means supporting said sleeve for rotation, a pulley freely rotatable on the sleeve, a prime mover, power transmission means between the prime mover and pulley, a plurality of driving dogs projecting from said pulley, a plurality of rockable dog and cam members for and having a shoulder in abutment with each pulley driving dog, a radial pin for each dog and cam member projecting from said sleeve on which said dog and cam members are rockably mounted, and a spring tensioning device for holding said dog and cam members against rocking movement except under overload torque on the spindle, said spring tensioning device including a plate in contact with the cam faces of the dog and cam members, a spring holding said plate in contact with said rockable dog and cam members faces displaceable upon rocking of said dog and cam members, a movable spindle carrier rotatably supporting the spindle for movement relative to the sleeve toward and from work, said spindle carrier having a definite stroke length, means including control means moving said spindle carrier, electromagnetic means effecting the operation of the control means, a switch operable by the spring tensioning device plate upon displacement thereof for energizing the electromagnetic means, additional dog means on the tool carrier actuating the control member to a position to cause the spindle carrier moving means to retract the spindle carrier from the work, means operable by the spindle carrier at the end of its stroke actuating the control member to a position to cause the spindle carrier moving means to retract the spindle carrier from the work, and additional means operable by the spindle carrier at the beginning of its stroke actuating the control means for stopping the spindle carrier moving means.

EDWARD J. BUSEMEYER.

REFERENCES CITED

The following references are of record in the file of this patent:

UNITED STATES PATENTS

| Number | Name | Date |
|---|---|---|
| 447,413 | Perry | Mar. 3, 1891 |
| 1,229,570 | Backscheider | June 12, 1917 |
| 1,883,164 | Vassakos | Oct. 18, 1932 |
| 2,260,327 | McKee | Oct. 28, 1941 |
| 2,418,220 | Churchill | Apr. 1, 1947 |